(12) United States Patent
Hatanaka et al.

(10) Patent No.: US 9,240,260 B2
(45) Date of Patent: Jan. 19, 2016

(54) FLAME-RETARDANT RESIN COMPOSITION AND ELECTRIC WIRE USING SAME

(71) Applicant: ADEKA CORPORATION, Tokyo (JP)

(72) Inventors: Tomoyuki Hatanaka, Saitama (JP); Michio Nakamura, Saitama (JP); Hisashi Sakurai, Saitama (JP)

(73) Assignee: ADEKA CORPORATION, Tokyo (JP)

(*) Notice: Subject to any disclaimer, the term of this patent is extended or adjusted under 35 U.S.C. 154(b) by 0 days.

(21) Appl. No.: 14/347,084

(22) PCT Filed: Sep. 26, 2012

(86) PCT No.: PCT/JP2012/074784
§ 371 (c)(1),
(2) Date: Mar. 25, 2014

(87) PCT Pub. No.: WO2013/047618
PCT Pub. Date: Apr. 4, 2013

(65) Prior Publication Data
US 2014/0235767 A1    Aug. 21, 2014

(30) Foreign Application Priority Data

Sep. 30, 2011    (JP) .................... 2011-217812

(51) Int. Cl.
| | | |
|---|---|---|
| H01B 3/44 | (2006.01) |
| H01B 7/295 | (2006.01) |
| C08L 23/04 | (2006.01) |
| C08K 5/49 | (2006.01) |

(52) U.S. Cl.
CPC ............... *H01B 3/446* (2013.01); *C08L 23/04* (2013.01); *H01B 3/441* (2013.01); *H01B 7/295* (2013.01); *C08K 5/49* (2013.01)

(58) Field of Classification Search
CPC .................... H01B 3/446; H01B 3/441
See application file for complete search history.

(56) References Cited

U.S. PATENT DOCUMENTS

| | | | | |
|---|---|---|---|---|
| 5,945,467 A | * | 8/1999 | Iwata et al. ............. | 523/205 |
| 2006/0167256 A1 | | 7/2006 | Kimura et al. | |
| 2007/0176154 A1 | | 8/2007 | Murase et al. | |
| 2008/0090075 A1 | | 4/2008 | Kondo et al. | |
| 2011/0082241 A1 | | 4/2011 | Kaneda et al. | |

FOREIGN PATENT DOCUMENTS

| | | | |
|---|---|---|---|
| CN | 101463155 A | 4/2008 | |
| CN | 102056992 A | 6/2009 | |
| CN | 102056992 A | 5/2011 | |
| JP | 2002-275317 A | 9/2002 | |
| JP | 2002-285011 A | 10/2002 | |
| JP | 2005-120021 A | 5/2005 | |
| JP | 2008-208269 A | 9/2008 | |
| JP | 2011-088970 A | 5/2011 | |
| JP | 2011-148936 A | 8/2011 | |
| WO | WO 00/02869 | * 1/2000 | ........... C07D 251/54 |
| WO | 2005/080494 A1 | 9/2005 | |

OTHER PUBLICATIONS

International Search Report issued in PCT/JP2012/074784, mailed on Nov. 27, 2012.
Chinese Office Action and Search Report, dated Jun. 12, 2015, for Chinese Application No. 201280047956.6.
Extended European Search Report for Application No. 12835386.9, dated Mar. 17, 2015.

* cited by examiner

*Primary Examiner* — Robert Harlan
(74) *Attorney, Agent, or Firm* — Birch, Stewart, Kolasch & Birch, LLP

(57) ABSTRACT

The present invention provides a flame-retardant resin composition having excellent flame retardancy, in which generation of a corrosive gas during combustion is suppressed.
The flame-retardant resin composition of the present invention, comprising the below-described component (A) or both of components (A) and (B) as a flame retardant component(s) in a halogen-free thermoplastic resin, wherein the ratio of the components (A) and (B) is 100:0 to 60:40 in terms of mass ratio; the electric conductivity of a gas generated during combustion, which is measured in accordance with IEC 60754-2, is not higher than 10.0 μS/mm; and the flame retardancy rating measured in accordance with the UL94VTM standard is VTM-2 or higher.
Component (A): a (poly)phosphate compound represented by the following Formula (1):

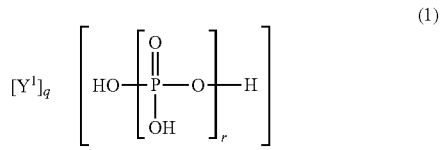

Component (B): a (poly)phosphate compound represented by the following Formula (2):

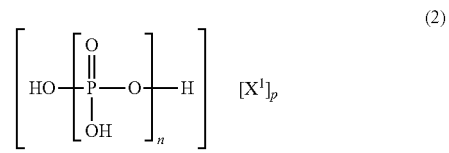

(wherein, $X^1$ represents ammonia or a triazine derivative represented by the following Formula (3))

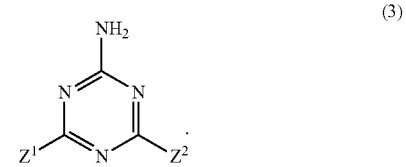

12 Claims, No Drawings

FLAME-RETARDANT RESIN COMPOSITION AND ELECTRIC WIRE USING SAME

TECHNICAL FIELD

The present invention relates to a flame-retardant resin composition. More particularly, the present invention relates to a flame-retardant resin composition having excellent flame retardancy, in which generation of a corrosive gas during combustion is suppressed.

BACKGROUND ART

In recent years, as environment-friendly electric wires that do not use any polyvinyl chloride or halogen-based flame retardant, the use of eco-material (EM) electric wires and cables has been rapidly spreading.

These eco-material electric wires and cables are demanded to contain no halogen element or toxic heavy metal, as well as to have flame retardancy and generate only a limited amount of corrosive gas or smoke when combusted.

For example, as a standard for eco-material electric wires and cables, IEC 60754-1 (JIS C3612) has been set. In addition, IEC 60754-2 (JIS C3666-2) has been set for methods of measuring the electric conductivity and the acidity of a gas generated during combustion, and IEC 60695-6-30 (JIS C60695-6-30) has been set for methods of measuring the smoke density. These standards prescribe the amount of corrosive gas generation and the smoke density.

Furthermore, flame retardancy is prescribed in, for example, the flame retardancy standard of the U.S. Underwriters Laboratories, Inc. (UL Standard).

In the above-described eco-material electric wire and cable applications, as a halogen-free resin, a polyolefin-based resin containing polyethylene as a main component is mainly used. Further, in order to impart flame retardancy, a metal hydroxide such as aluminum hydroxide or magnesium hydroxide is used as a halogen-free flame retardant (see Patent Documents 1 and 2).

PRIOR ART DOCUMENTS

Patent Documents

Patent Document 1: Japanese Unexamined Patent Application Publication No. 2002-275317
Patent Document 2: Japanese Unexamined Patent Application Publication No. 2002-285011

SUMMARY OF THE INVENTION

Problems to be Solved by the Invention

However, since it cannot be said that metal hydroxides provide sufficient flame retardancy, it is required to blend a large amount of a metal hydroxide in order to attain satisfactory flame retardancy and this consequently causes problems of, for example, impairing the mechanical characteristics and outer appearance of the resulting electric wire.

In view of the above, an object of the present invention is to provide a flame-retardant resin composition having excellent flame retardancy, in which generation of a corrosive gas during combustion is suppressed. Another object of the present invention is to provide halogen-free eco-material electric wire and cable in which the above-described flame-retardant resin composition is used.

Means for Solving the Problems

The present inventors intensively studied in order to solve the above-described problems and discovered that the above-described problems can be solved by using a specific flame retardant, thereby completing the present invention.

That is, the flame-retardant resin composition of the present invention, comprising the below-described component (A) or both of components (A) and (B) as a flame retardant component(s) in a halogen-free thermoplastic resin, wherein, when the flame-retardant resin composition comprises the component (B), the ratio of the components (A) and (B) is 100:0 to 60:40 in terms of mass ratio; the electric conductivity of a gas generated during combustion, which is measured in accordance with IEC 60754-2, is not higher than 10.0 µS/mm; and the flame retardancy rating measured in accordance with the UL94VTM standard is VTM-2 or higher.

Component (A): a (poly)phosphate compound represented by the following Formula (1):

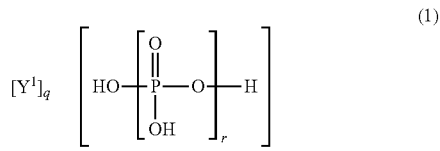

(wherein, r represents a number of 1 to 100; $Y^1$ represents $[R^1R^2N(CH_2)_mNR^3R^4]$, piperazine or a piperazine ring-containing diamine; $R^1$, $R^2$, $R^3$ and $R^4$ each independently represent a hydrogen atom or a linear or branched alkyl group having 1 to 5 carbon atoms; $R^1$, $R^2$, $R^3$ and $R^4$ may be the same group or different groups; m represents an integer of 1 to 10; and q represents a number which satisfies a relationship, $0 < q \le r+2$)

Component (B): a (poly)phosphate compound represented by the following Formula (2):

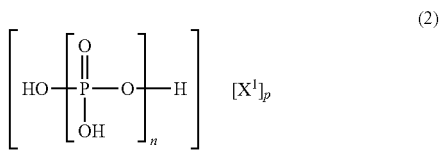

(wherein, n represents a number of 1 to 100; $X^1$ represents ammonia or a triazine derivative represented by the following Formula (3); and p represents a number which satisfies a relationship, $0 < p \le n+2$)

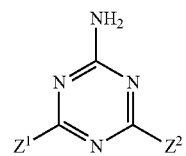

(wherein, $Z^1$ and $Z^2$ may be the same or different and are each a group selected from the group consisting of a —$NR^5R^6$ group [wherein, $R^5$ and $R^6$ each independently represent a hydrogen atom, a linear or branched alkyl group having 1 to 6 carbon atoms or a methylol group], a hydroxy group, a mercapto group, a linear or branched alkyl group having 1 to 10 carbon atoms, a linear or branched alkoxy group having 1 to 10 carbon atoms, a phenyl group and a vinyl group)

In the flame-retardant resin composition of the present invention, it is preferred that, based on the total amount thereof, the content of nitrogen originated from the above-described component (B) be 0% by mass to less than 4.0% by mass and the total content of nitrogen originated from the component (A) and nitrogen originated from the component (B) be 3.0% by mass to less than 5.75% by mass.

In the flame-retardant resin composition of the present invention, it is preferred that the ratio of the above-described components (A) and (B) be 100:0 to 60:40 in terms of mass ratio and that the content of the component (B) be 9 parts by mass or less with respect to 100 parts by mass of the flame-retardant resin composition.

In the flame-retardant resin composition of the present invention, it is preferred that the total content of the components (A) and (B) be 25 to 40% by mass.

It is also preferred that the flame-retardant resin composition of the present invention further comprise zinc oxide as a component (C).

Further, in the flame-retardant resin composition of the present invention, it is preferred that the above-described component (A) be a piperazine polyphosphate wherein, in the above-described Formula (1), q is 1 and $Y^1$ is piperazine.

Further, in the flame-retardant resin composition of the present invention, it is preferred that the above-described piperazine polyphosphate be piperazine pyrophosphate.

Further, in the flame-retardant resin composition of the present invention, it is preferred that the above-described component (B) be a melamine pyrophosphate wherein, in the above-described Formula (2), n is 2, p is 2 and $X^1$ is melamine.

Further, in the flame-retardant resin composition of the present invention, it is preferred that the above-described thermoplastic resin comprise at least one polyolefin-based resin.

Further, in the flame-retardant resin composition of the present invention, it is preferred that the above-described polyolefin-based resin be a polyethylene-based resin.

Further, it is preferred that the flame-retardant resin composition of the present invention be a halogen-free flame-retardant resin composition.

Further, the flame-retardant resin composition of the present invention can be suitably used for an electric wire.

The halogen-free flame-retardant electric wire or cable of the present invention is characterized by using the above-described halogen-free flame-retardant resin composition for an electric wire.

Effects of the Invention

According to the present invention, a flame-retardant resin composition having excellent flame retardancy, in which generation of a corrosive gas during combustion is suppressed, can be provided. By allowing the flame-retardant resin composition of the present invention to be a halogen-free composition, it can be suitably used in the eco-material electric wire and cable applications.

MODE FOR CARRYING OUT THE INVENTION

First, a halogen-free thermoplastic resin used in the flame-retardant resin composition of the present invention will be described.

The halogen-free thermoplastic resin used in the present invention is not particularly restricted as long as it is not a halogen-containing resin such as polyvinyl chloride, and any thermoplastic resin can be used. Examples thereof include polyolefin-based resins, thermoplastic elastomers, engineering plastics, polystyrene-based resins, polyester-based resins and polyamide-based resin. Thereamong, polyolefin-based resins are preferred and, among polyolefin-based resins, polyethylene-based resins are more preferred.

Examples of polyethylene-based resins include low-density polyethylenes (LDPE), linear low-density polyethylenes (LLDPE), linear very low-density polyethylenes (VLDPE), high-density polyethylenes (HDPE), ethylene-methyl methacrylate copolymers (EMMA), ethylene-methyl acrylate copolymers (EMA), ethylene-ethyl acrylate copolymers (EEA), ethylene-vinyl acetate copolymers (EVA), ethylene-glycidyl methacrylate copolymers, ethylene-butene-1 copolymers, ethylene-butene-hexene ternary copolymers, ethylene-propylene-diene ternary copolymers (EPDM), ethylene-octene copolymers (EOR), ethylene-copolymerized polypropylenes, ethylene-propylene copolymers (EPR), poly-4-methyl-pentene-1, maleic acid-grafted low-density polyethylenes, hydrogenated styrene-butadiene copolymers (H-SBR), maleic acid-grafted linear low-density polyethylenes, copolymers of ethylene and α-olefin having 4 to 20 carbon atoms, maleic acid-grafted ethylene-methyl acrylate copolymers, maleic acid-grafted ethylene-vinyl acetate copolymers, ethylene-maleic anhydride copolymers, ethylene-ethyl acrylate-maleic anhydride ternary copolymers, ethylene-propylene-butene-1 ternary copolymers containing butane-1 as a main component, and ethylene-propylene rubbers. These polyethylene-based resins may be used individually, or two or more thereof may be used in combination.

In addition, examples of polypropylene-based resins that are classified into polyolefin-based resin include, as polypropylenes (PP), isotactic polypropylenes and syndiotactic polypropylenes, and any of homo-polypropylenes and random polypropylenes containing an ethylene-based copolymer component can be used. Further, these polypropylenes can be blended with the above-described polyethylene-based resins as well.

Examples of the thermoplastic elastomers include styrene-based, ester-based, urethane-based, amide-based and olefin-based thermoplastic elastomers.

The term "styrene-based thermoplastic elastomer" refers to a styrene-based block copolymer and examples thereof include, based on the type of its soft segment, SBS (PS (polystyrene)-polybutadiene-PS), SIS (PS-polyisoprene-PS) and SEBS (PS-polyethylene/butylene-PS). In addition, examples of the styrene-based thermoplastic elastomers also include blends of these styrene-based block copolymers and polypropylenes (PP) or the like.

The term "ester-based thermoplastic elastomer" is a general term for those elastomers that contain polybutene terephthalate (PBT) or polyethylene terephthalate (PET) as a hard segment and a soft polyester copolymer as a soft segment. Examples of such elastomers include polyether-ester copolymers whose soft segment is composed of a condensate of polytetramethylene glycol (PTMG) and terephthalic acid, and polyester-ester copolymers in which polycaprolactone is used.

The hard segment of a urethane-based thermoplastic elastomer is polyurethane and, based on the type of soft segment, there are urethane-based thermoplastic elastomers of polyester-type and polyether-type. Further, examples of polyester-type urethane-based thermoplastic elastomer include caprolactone-based, adipate-based and polycarbonate-based thermoplastic elastomers.

The term "amide-based thermoplastic elastomer" refers to a thermoplastic elastomer which contains nylon 6, nylon 66, nylon 11, nylon 12 or the like as a hard segment and a polyether or polyester as a soft segment.

The term "olefin-based thermoplastic elastomer" refers to a thermoplastic elastomer containing a polyolefin resin as a hard segment and there are blend-type and copolymer-type olefin-based thermoplastic elastomers. Here, the term "olefin-based thermoplastic elastomer" refers to, among those in which the hard segment is a polymer component, one which contains the polymer component in a range of 15 to 95% by weight.

The hard segment is required to be a crystalline polyolefin and examples thereof include polypropylenes (PP), high-density polyethylenes (HDPE), low-density polyethylenes (LDPE) and linear low-density polyethylenes (LLDPE). Examples of soft segment include ethylene-propylene copolymers (EPM), ethylene-propylene-diene ternary copolymers (EPDM), acrylonitrile-butadiene copolymers (NBR), hydrogenated NBRs, ethylene-octene copolymers (EOR), ethylene-butene-1 copolymers (EBR), linear low-density polyethylenes (LLDPE), very low-density polyethylenes (VLDPE), ethylene-ethyl acrylate copolymers (EEA), ethylene-vinyl acetate copolymers (EVA) and styrene component-containing elastomers.

Further, in the present invention, olefin-based thermoplastic elastomers are also classified into polyolefin-based resin and those which contain an ethylene component are also classified into polyethylene-based resin.

Examples of the thermoplastic elastomers also include those in which the above-described soft segment is partially cross-linked with organic peroxide or the like, and those in which soft segments that are dispersed at the time of kneading are completely cross-linked (dynamic vulcanization).

Examples of the engineering plastics include polyamides, polycarbonates, polybutylene terephthalates, polyethylene terephthalates, modified polyphenylene oxides, polyether imides, polyamide imides, polyphenylene sulfides, polyether sulfones, polyether ether ketones and polyether ketones. Thereamong, polyamide 46, polyamide 610, polyamide 612, polyamide 11, polyamide 12, polybutylene terephthalates, polyphenylene oxides modified with a styrene-based block copolymer, polyether imides and polyether ether ketones, all of which are relatively flexible, are preferred.

The above-described halogen-free thermoplastic resins that can be used in the flame-retardant resin composition of the present invention may be used individually, or two or more thereof may be used in combination.

Next, the component (A) of the present invention will be described.

In the present invention, the (poly)phosphate compound represented by the following Formula (1) used as the component (A) is a salt between a (poly)phosphoric acid and a diamine represented by $Y^1$:

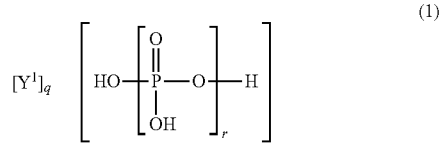

(1)

In the Formula (1), r represents an integer of 1 to 100; $Y^1$ represents $[R^1R^2N(CH_2)_mNR^3R^4]$, piperazine or a piperazine ring-containing diamine; $R^1$, $R^2$, $R^3$ and $R^4$ each independently represent a hydrogen atom or a linear or branched alkyl group having 1 to 5 carbon atoms; $R^1$, $R^2$, $R^3$ and $R^4$ may be the same group or different groups; m represents an integer of 1 to 10; and q represents a number which satisfies a relationship, $0<q \le r+2$. Here, r is preferably an integer of 1 to 20, more preferably an integer of 1 to 10.

The diamine represented by $Y^1$ is $R^1R^2N(CH_2)_mNR^3R^4$, piperazine or a piperazine ring-containing diamine. Here, $R^1$, $R^2$, $R^3$ and $R^4$ are each independently a hydrogen atom or a linear or branched alkyl group having 1 to 5 carbon atoms and $R^1$, $R^2$, $R^3$ and $R^4$ may be the same group or different groups. Examples of the linear or branched alkyl group having 1 to 5 carbon atoms which is represented by the above-described $R^1$ to $R^4$ include methyl, ethyl, propyl, isopropyl, butyl, sec-butyl, tert-butyl, isobutyl, amyl, isoamyl and tert-amyl.

Examples of the piperazine ring-containing diamine include compounds in which at least one of the 2-, 3-, 5- and 6-positions of piperazine is substituted with an alkyl group (which has preferably 1 to 5 carbon atoms); and compounds in which the amino group(s) at the 1- and/or 4-position(s) of piperazine is/are substituted with an amino group-substituted alkyl group (which has preferably 1 to 5 carbon atoms).

Examples of the diamine represented by $Y^1$ in the above-described Formula (1) include N,N,N',N'-tetramethyldiaminomethane, ethylenediamine, N,N'-dimethylethylenediamine, N,N'-diethylethylenediamine, N,N-dimethylethylenediamine, N,N-diethylethylenediamine, N,N,N',N'-tetramethylethylenediamine, 1,2-propanediamine, 1,3-propanediamine, tetramethylenediamine, pentamethylenediamine, hexamethylenediamine, 1,7-diaminoheptane, 1,8-diaminooctane, 1,9-diaminononane, 1,10-diaminodecane, piperazine, trans-2,5-dimethylpiperazine, 1,4-bis(2-aminoethyl)piperazine and 1,4-bis(3-aminopropyl)piperazine.

Among those (poly)phosphate compounds represented by the above-described Formula (1), examples of a compound preferably used as the component (A) include salts of phosphoric acid and piperazine, such as piperazine orthophosphate, piperazine pyrophosphate and piperazine polyphosphate. In the present invention, thereamong, piperazine polyphosphate in which q is 1 and $Y^1$ is piperazine in the above-described Formula (1) is preferred and piperazine pyrophosphate is particularly preferred.

A salt of phosphoric acid and piperazine, such as piperazine pyrophosphate, can be easily obtained as a poorly water-soluble precipitate by allowing piperazine and pyrophosphoric acid to react in water or an aqueous methanol solution.

In the present invention, in cases where piperazine (poly)phosphate is used, a salt obtained from piperazine and a polyphosphoric acid composed of a mixture of orthophosphoric acid, pyrophosphoric acid, tripolyphosphoric acid and other polyphosphoric acid may also be used. In this case, the constitution of the polyphosphoric acid used as a starting material is not particularly restricted.

Next, the component (B) of the present invention will be described.

In the present invention, the (poly)phosphate compound represented by the below-described Formula (2) used as the component (B) is a salt between phosphoric acid and ammonia or a triazine derivative represented by the below-described Formula (3).

Component (B): a (poly)phosphate compound represented by the following Formula (2):

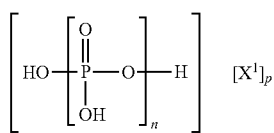
(2)

In the Formula (2), n represents an integer of 1 to 100; $X^1$ represents ammonia or a triazine derivative represented by the following Formula (3); and p represents a number which satisfies a relationship, $0<p\leq n+2$. Here, n is preferably an integer of 1 to 20, more preferably an integer of 1 to 10.

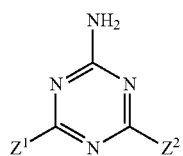
(3)

In the Formula (3), $Z^1$ and $Z^2$ may be the same or different and are each a group selected from the group consisting of a —$NR^5R^6$ group [wherein, $R^5$ and $R^6$ each independently represent a hydrogen atom, a linear or branched alkyl group having 1 to 6 carbon atoms or a methylol group], a hydroxy group, a mercapto group, a linear or branched alkyl group having 1 to 10 carbon atoms, a linear or branched alkoxy group having 1 to 10 carbon atoms, a phenyl group and a vinyl group.

Examples of the linear or branched alkyl group having 1 to 10 carbon atoms which is represented by $Z^1$ and $Z^2$ in the above-described Formula (3) include methyl, ethyl, propyl, isopropyl, butyl, sec-butyl, tert-butyl, isobutyl, amyl, isoamyl, tert-amyl, hexyl, cyclohexyl, heptyl, isoheptyl, tert-heptyl, n-octyl, isooctyl, tert-octyl, 2-ethylhexyl, nonyl and decyl. Examples of the linear or branched alkoxy group having 1 to 10 carbon atoms include groups that are derived from the above-described alkyl groups. Further, examples of the linear or branched alkyl group having 1 to 6 carbon atoms or a methylol group which corresponds to $R^5$ and $R^6$ in the —$NR^5R^6$ group that can be represented by $Z^1$ and $Z^2$ include, among the above-described alkyl groups, those which have 1 to 6 carbon atoms.

Specific examples of the above-described triazine derivative include melamine, acetoguanamine, benzoguanamine, acrylguanamine, 2,4-diamino-6-nonyl-1,3,5-triazine, 2,4-diamino-6-hydroxy-1,3,5-triazine, 2-amino-4,6-dihydroxy-1,3,5-triazine, 2,4-diamino-6-methoxy-1,3,5-triazine, 2,4-diamino-6-ethoxy-1,3,5-triazine, 2,4-diamino-6-propoxy-1,3,5-triazine, 2,4-diamino-6-isopropoxy-1,3,5-triazine, 2,4-diamino-6-mercapto-1,3,5-triazine and 2-amino-4,6-dimercapto-1,3,5-triazine.

Among those (poly)phosphate compounds represented by the above-described Formula (2), examples of a compound preferably used as the component (B) include salts of phosphoric acid and melamine, and ammonium polyphosphate compounds; however, in the present invention, a salt of phosphoric acid and melamine is particularly preferably used.

Examples of the above-described salts of phosphoric acid and melamine include melamine orthophosphate, melamine pyrophosphate and melamine polyphosphate. In the present invention, thereamong, it is particularly preferred to use melamine pyrophosphate in which n is 2, p is 2 and $X^1$ is melamine in the above-described Formula (2). These salts of phosphoric acid and melamine, for example, melamine pyrophosphate, can be obtained by adding sodium pyrophosphate and melamine to hydrochloric acid, allowing them to react at an arbitrary reaction ratio and then neutralizing the resultant with sodium hydroxide.

Further, the term "ammonium polyphosphate compound" used above means ammonium polyphosphate itself or a compound containing ammonium polyphosphate as a main component. As the ammonium polyphosphate itself, for example, commercial products such as EXOLIT AP422 and EXOLIT AP750 manufactured by Clariant International Ltd., Phos-Check P/30 and Phos-Check P/40 manufactured Monsanto Company, and SUMISAFE P manufactured by Sumitomo Chemical Co., Ltd. (all of which are trade names of the respective manufacturers) can be used.

Examples of the above-described compound containing ammonium polyphosphate as a main component include ammonium polyphosphate which is coated or microencapsulated with a thermosetting resin; ammonium polyphosphate whose surface is coated with a melamine monomer, other nitrogen-containing organic compound or the like; ammonium polyphosphate treated with a surfactant or silicone; and ammonium polyphosphate which is, in the production process thereof, made insoluble by an addition of melamine or the like. Examples of commercial products of such compounds include EXOLIT AP462 manufactured by Clariant International Ltd.; SUMISAFE PM manufactured by Sumitomo Chemical Co., Ltd.; and BUDIT 3167, FR Cros C30 and FR Cros C60 manufactured by Budenheim (all of which are trade names of the respective manufacturers).

The components (A) and (B) of the present invention are flame retardant components that are capable of exerting flame retardancy by forming a surface expansion (intumescent) layer in the initial stage of combustion and inhibiting diffusion of thermal decomposition products and heat conduction.

In the present invention, it is preferred that, based on the total amount of the flame-retardant resin composition, the content of nitrogen originated from the above-described component (B) be 0% by mass to less than 4.0% by mass and the total content of nitrogen originated from the component (A) and nitrogen originated from the component (B) be 3.0% by mass to less than 5.75% by mass. The present inventors discovered that a high content of nitrogen originated from the component (B) tends to result in an increased electric conductivity of a gas generated during combustion. One of the possible reasons for this is that ammonia is generated from the nitrogen content of the component (B) during combustion and this ammonia dissolves in water to increase the electric conductivity of the gas. Further, since the component (A) also contains nitrogen, it is preferred that the total content of nitrogen originated from the component (A) and nitrogen originated from the component (B) be in the above-described range. The total content of nitrogen originated from the component (A) and nitrogen originated from the component (B) is more preferably 3.0% by mass to less than 5.5% by mass.

The flame-retardant resin composition of the present invention does not have to contain the component (B) as a flame retardant and may contain both of the components (A) and (B). As for the content ratio of the components (A) and (B) in the resin composition, the ratio of the components (A) and (B) is 100:0 to 60:40 in terms of mass ratio and it is preferably 100:0 to 75:25 from the standpoints of the flame retardancy and the electric conductivity of the gas generated during combustion. Further, the content of the component (B)

is preferably 9 parts by mass or less, more preferably 7 parts by mass or less, with respect to 100 parts by mass of the resin composition. The present inventors discovered that a resin composition containing the component (B) tends to have superior flame retardancy than a resin composition containing only the component (A) in the same flame retardant amount and that, however, an excessively high content of the component (B) results in an increased electric conductivity of the gas generated during combustion. In cases where the resin composition contains the component (B), the content ratio of the components (A) and (B) is preferably 99:1 to 60:40, more preferably 95:5 to 75:25.

In the flame-retardant resin composition of the present invention, generation of a corrosive gas or a toxic gas during combustion is suppressed and the electric conductivity of a gas generated during combustion, which is measured in accordance with IEC 60754-2 (Test on gases evolved during combustion of electric cables), is not higher than $10.0\,\mu S/mm$.

The flame-retardant resin composition of the present invention has a frame retardancy rating of VTM-2 or higher, preferably VTM-0 or higher, based on the UL94VTM standard, which is a flame retardancy standard prescribed by the U.S. Underwriters Laboratories, Inc.

In the flame-retardant resin composition of the present invention, from the standpoints of the flame retardancy and the electric conductivity of a gas generated during combustion, the total content of the components (A) and (B) is preferably 25 to 40% by mass, more preferably 30 to 40% by mass. The flame-retardant resin composition of the present invention may contain the components (A) and (B) in excess of 40% by mass; however, when it is made into an electric wire, the mechanical properties and the like may be adversely affected. In addition, a lower total content of the components (A) and (B) tends to result in a lower electric conductivity of the gas generated during combustion and a higher total content tends to result in a higher flame retardancy rating.

It is preferred that the flame-retardant resin composition of the present invention further contain zinc oxide, which is a flame retardant auxiliary, as a component (C). This zinc oxide may be surface-treated as well. In the present invention, commercially available zinc oxide can be used. Examples thereof include Zinc Oxide Grade 1 (manufactured by Mitsui Mining & Smelting Co., Ltd.), partially coated-type Zinc Oxide (manufactured by Mitsui Mining & Smelting Co., Ltd.), NANOFINE 50 (ultra-fine zinc oxide particle having an average particle size of $0.02\,\mu m$; manufactured by Sakai Chemical Industry Co., Ltd.) and NANOFINE K (ultra-fine zinc oxide particle coated with zinc silicate, average particle size: $0.02\,\mu m$; manufactured by Sakai Chemical Industry Co., Ltd.). The amount of zinc oxide to be contained in the resin composition is preferably 0.5 to 10% by mass, more preferably 1.2 to 5% by mass.

In the flame-retardant resin composition of the present invention, the component (A) or both of the components (A) and (B) may be incorporated in a halogen-free thermoplastic resin along with, as required, the component (C) and other arbitrary component(s). The timing of adding these components to a halogen-free thermoplastic resin is not particularly restricted. For example, two or more components that are selected from the components to be incorporated may be combined in a single package in advance and then added, or the components may be added to a resin individually. In cases where the components are combined in a single package, the components may each be pulverized before being mixed, or the components may be mixed and then pulverized.

Further, it is preferred that the flame-retardant resin composition of the present invention achieve the properties prescribed by IEC 60754-1 (600V flame-resistant polyethylene-insulated electric wires) (JIS C3612), which is a standard for eco-material electric wires and cables.

For example, it is desired that generation of a corrosive gas or a toxic gas be suppressed during combustion and, in the flame-retardant resin composition of the present invention, it is preferred that the electric conductivity of a gas generated during combustion, which is measured in accordance with IEC 60754-2 (Test on gases evolved during combustion of electric cables) (JIS C3666-2), be not higher than $10.0\,\mu S/mm$ and, at the same time, the acidity measured in accordance with IEC 60754-2 (Test on gases evolved during combustion of electric cables) (JIS C3666-2) be pH 4.3 or higher. Particularly, in the flame-retardant resin composition of the present invention, it is expected that a reduction in pH caused by generation of a toxic acid gas can be avoided.

Further, it is preferred that smoke generation during combustion be inhibited. Specifically, for example, it is preferred that the smoke density, which is measured in accordance with IEC 60695-6-30 (Environmental testing—Electric and electronic products—Method of testing fire hazard and potential and contingency risks of fire) (JIS C60695-6-30), be 150 or less. Particularly, in the present invention, it is believed that smoke generation is inhibited by the formation of a surface expansion (intumescent) layer.

Further, in the flame-retardant resin composition of the present invention, from the standpoint of drip-inhibition, a layered silicate may also be incorporated as an arbitrary component. The term "layered silicate" refers to a layered silicate mineral and it may contain a cation between layers. The above-described layered silicate is not particularly restricted and examples thereof include smectite-type clay minerals such as saponite, montmorillonite, hectorite, beidellite, stevensite and nontronite, as well as talc, vermiculite, halloysite and swelling mica. Thereamong, from the standpoint of drip-inhibition, saponite or talc is preferably used and, from the standpoint of the economic efficiency such as price, it is particularly preferred to use talc.

Examples of the above-described saponite include SUMECTON SA (manufactured by Kunimine Industries Co., Ltd.) and examples of montmorillonite include S-BEN (manufactured by HOJUN Co., Ltd.), S-BEN E (manufactured by HOJUN Co., Ltd.), S-BEN N-400 (manufactured by HOJUN Co., Ltd.) and S-BEN NO12 (manufactured by HOJUN Co., Ltd.). Examples of talc include fine powder talc MICRO ACE Series manufactured by NIPPON TALC Co., Ltd., such as MICRO ACE P-4; ultra-fine powder talc SG Series manufactured by NIPPON TALC Co., Ltd.; and NANO ACE Series manufactured by NIPPON TALC Co., Ltd.

The layered silicate may be of a naturally occurring product or a synthetic product. Further, the above-described layered silicates may be used individually, or two or more thereof may be used in combination.

A cation which may exist between the layers of the layered silicate means a metal ion of sodium, calcium or the like that exists on the surface of a crystal of the layered silicate. These metal ions have cation-exchange capacity with a cationic substance; therefore, a variety of cationic substances, such as organic cations, (quaternary) ammonium cation and phosphonium cation, can be inserted (intercalated) between the crystal layers of the above-described layered silicate.

The cations existing between the layers of the above-described layered silicate may be a metal ion, or some or all of the cations may be organic cations, (quaternary) ammonium cations or phosphonium cations.

Examples of the above-described metal ion include sodium ion, potassium ion, calcium ion, magnesium ion, lithium ion, nickel ion, copper ion and zinc ion.

Examples of the organic cation or quaternary ammonium cation include lauryltrimethylammonium cation, stearyltrimethylammonium cation, trioctylmethylammonium cation, distearyldimethylammonium cation, di-hardened beef tallow-dimethylammonium cation and distearyldibenzylammonium cation.

These cations may exist individually, or two or more thereof may exist together.

Further, in the flame-retardant resin composition of the present invention, from the standpoint of the water resistance, a polycarbodiimide may also be incorporated as an arbitrary component. Examples of polycarbodiimide that can be used in the present invention include (co)polymers that are obtained using at least one selected from polyvalent isocyanate compounds. Specific examples of the polyvalent isocyanates include hexamethylene diisocyanate, xylene diisocyanate, cyclohexane diisocyanate, pyridine diisocyanate, 2,4-tolylene diisocyanate, 2,6-tolylene diisocyanate, 4,4-diphenylmethane diisocyanate, p-phenylene diisocyanate, m-phenylene diisocyanate and 1,5-naphthylene diisocyanate. As the above-described polycarbodiimide, from the standpoint of the water resistance, CARBODILITE HMV-8CA and CARBODILITE LA-1, which are manufactured by Nisshinbo Chemical Inc. are preferred.

Further, in the flame-retardant resin composition of the present invention, in order to inhibit secondary aggregation at the time of blending and improve the water resistance, a silicone oil may be incorporated as well. Examples of the silicone oil include dimethyl silicone oil in which the side chains and the terminals of polysiloxane are all methyl groups; methylphenyl silicone oil in which some of the side chains of polysiloxane are phenyl groups; methyl hydrogen silicone oil in which some of the side chains of polysiloxane are hydrogens; and copolymers of these silicone oils. Further, a modified silicone oil in which an organic group is introduced to some of these side chains and/or terminals, the silicone oils being amine-modified, epoxy-modified, alicyclic epoxy-modified, carboxyl-modified, carbinol-modified, mercapto-modified, polyether-modified, long chain alkyl-modified, fluoroalkyl-modified, higher fatty acid ester-modified, higher fatty acid amide-modified, silanol-modified, diol-modified, phenol-modified and/or aralkyl-modified, may also be used.

Specific examples of the above-described silicone oil include, as dimethyl silicone oil, KF-96 (manufactured by Shin-Etsu Chemical Co., Ltd.), KF-965 (manufactured by Shin-Etsu Chemical Co., Ltd.) and KF-968 (manufactured by Shin-Etsu Chemical Co., Ltd.); and, as methyl hydrogen silicone oil or silicone oil having a methyl hydrogen polysiloxane structure, KF-99 (manufactured by Shin-Etsu Chemical Co., Ltd.), KF-9901 (manufactured by Shin-Etsu Chemical Co., Ltd.), HMS-151 (manufactured by Gelest, Inc.), HMS-071 (manufactured by Gelest, Inc.), HMS-301 (manufactured by Gelest, Inc.) and DMS-H21 (manufactured by Gelest, Inc.). Examples of methylphenyl silicone oil include KF-50 (manufactured by Shin-Etsu Chemical Co., Ltd.), KF-53 (manufactured by Shin-Etsu Chemical Co., Ltd.), KF-54 (manufactured by Shin-Etsu Chemical Co., Ltd.) and KF-56 (manufactured by Shin-Etsu Chemical Co., Ltd.). Examples of epoxy-modified product include X-22-343 (manufactured by Shin-Etsu Chemical Co., Ltd.), X-22-2000 (manufactured by Shin-Etsu Chemical Co., Ltd.), KF-101 (manufactured by Shin-Etsu Chemical Co., Ltd.), KF-102 (manufactured by Shin-Etsu Chemical Co., Ltd.) and KF-1001 (manufactured by Shin-Etsu Chemical Co., Ltd.), and examples of carboxyl-modified product include X-22-3701E (manufactured by Shin-Etsu Chemical Co., Ltd.). Further, examples of carbinol-modified product include X-22-4039 (manufactured by Shin-Etsu Chemical Co., Ltd.) and X-22-4015 (manufactured by Shin-Etsu Chemical Co., Ltd.), and examples of amine-modified product include KF-393 (manufactured by Shin-Etsu Chemical Co., Ltd.).

Further, in the flame-retardant resin composition of the present invention, a silane coupling agent may also be incorporated. A silane coupling agent is a compound having an organic functional group and a hydrolyzable group and it is represented by, for example, a general formula, $A\text{-}(CH_2)_k\text{-}Si(OR)_3$. In this formula, A represents an organic functional group; k represents a number of 1 to 3; and R represents a methyl group or an ethyl group. Examples of the organic group represented by A include epoxy group, vinyl group, methacryl group, amino group and mercapto group. As a silane coupling agent to be used in the present invention, one which has an epoxy group is particularly preferred.

In the flame-retardant resin composition of the present invention, a lubricant can also be incorporated as required. Examples of the lubricant include pure hydrocarbon-based lubricants such as liquid paraffin, natural paraffin, microwax, synthetic paraffins, low-molecular-weight polyethylenes and polyethylene wax; halogenated hydrocarbon-based lubricants; fatty acid-based lubricants such as higher fatty acids and oxy fatty acids; fatty acid amide-based lubricants such as fatty acid amides and bis-fatty acid amides; ester-based lubricants such as lower alcohol esters of fatty acids, polyhydric alcohol esters of fatty acids such as glyceride, polyglycol esters of fatty acids and fatty alcohol esters of fatty acids (ester waxes); metal soaps; fatty alcohols; polyhydric alcohols; polyglycols; polyglycerols; partial esters of fatty acids and polyhydric alcohols; partial ester-based lubricants composed of fatty acid, polyglycol and polyglycerol; (meth)acrylate-based copolymers; silicone oils; and mineral oils.

In the present invention, the amount of a lubricant to be contained in the resin composition is preferably 0.01 to 5% by mass, more preferably 0.1 to 1% by mass.

In the flame-retardant resin composition of the present invention, it is also preferred to add, as required, for example, a phenol-based antioxidant, a phosphorus-based antioxidant, a thioether-based antioxidant, an ultraviolet absorber, a hindered amine-based light stabilizer and/or an anti-aging agent so as to stabilize the flame-retardant resin composition.

Examples of the above-described phenol-based antioxidant include 2,6-di-tert-butyl-p-cresol, 2,6-diphenyl-4-octadecyloxyphenol, distearyl(3,5-di-tert-butyl-4-hydroxybenzyl)phosphonate, 1,6-hexamethylenebis[(3,5-di-tert-butyl-4-hydroxyphenyl)propionic acid amide], 4,4'-thiobis(6-tert-butyl-m-cresol), 2,2'-methylenebis(4-methyl-6-tert-butylphenol), 2,2'-methylenebis(4-ethyl-6-tert-butylphenol), 4,4'-butylidenebis(6-tert-butyl-m-cresol), 2,2'-ethylidenebis (4,6-di-tert-butylphenol), 2,2'-ethylidenebis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl) phenol, stearyl(3,5-di-tert-butyl-4-hydroxyphenyl) propionate, tetrakis[3-(3,5-di-tert-butyl-4-hydroxyphenyl) propionic acid methyl]methane, thiodiethylene glycol-bis[(3,5-di-tert-butyl-4-hydroxyphenyl)propionate], 1,6-hexamethylenebis[(3,5-di-tert-butyl-4-hydroxyphenyl) propionate], bis[3,3-bis(4-hydroxy-3-tert-butylphenyl)

butyric acid]glycol ester, bis[2-tert-butyl-4-methyl-6-(2-hydroxy-3-tert-butyl-5-methylbenzyl)phenyl]terephthalate, 1,3,5-tris[(3,5-di-tert-butyl-4-hydroxyphenyl)propionyloxyethyl]isocyanurate, 3,9-bis[1,1-dimethyl-2-{(3-tert-butyl-4-hydroxy-5-methylphenyl)propionyloxy}ethyl]-2,4,8,10-tetraoxaspiro[5,5]undecane and triethylene glycol-bis[(3-tert-butyl-4-hydroxy-5-methylphenyl)propionate]. The amount of the above-described phenol-based antioxidant(s) to be used in the flame-retardant resin composition is preferably 0.001 to 5% by mass, more preferably 0.05 to 3% by mass.

Examples of the above-described phosphorus-based antioxidant include trisnonylphenyl phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl)isopropylidenediphenol diphosphite, tetra(tridecyl)-4,4'-n-butylidenebis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, 2,2'-methylenebis(4,6-tert-butylphenyl)-2-ethylhexyl phosphite, 2,2'-methylenebis(4,6-tert-butylphenyl)-octadecyl phosphite, 2,2'-ethylidenebis(4,6-di-tert-butylphenyl)fluorophosphite, tris(2-[(2,4,8,10-tetrakis-tert-butyldibenzo[d,f][1,3,2]dioxaphosphepine-6-yl)oxy]ethyl)amine, and phosphite of 2-ethyl-2-butyl propylene glycol and 2,4,6-tri-tert-butylphenol. The amount of the above-described phosphorus-based antioxidant(s) to be used in the resin composition is preferably 0.001 to 5% by mass, more preferably 0.05 to 3% by mass.

Examples of the above-described thioether-based antioxidant include dialkyl thiodipropionates such as dilauryl thiodipropionate, dimyristyl thiodipropionate and distearyl thiodipropionate; and pentaerythritol tetra(β-alkylmercaptopropionic acid ester)s. The amount of the above-described thioether-based antioxidant(s) to be used in the flame-retardant resin composition is preferably 0.001 to 5% by mass, more preferably 0.05 to 3% by mass.

Examples of the above-described ultraviolet absorber include 2-hydroxybenzophenones such as 2,4-dihydroxybenzophenone, 2-hydroxy-4-methoxybenzophenone, 2-hydroxy-4-octoxybenzophenone and 5,5'-methylenebis(2-hydroxy-4-methoxybenzophenone); 2-(2'-hydroxyphenyl)benzotriazoles such as 2-(2'-hydroxy-5'-methylphenyl)benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, 2,2'-methylenebis(4-tert-octyl-6-(benzotriazolyl)phenol) and 2-(2'-hydroxy-3'-tert-butyl-5'-carboxyphenyl)benzotriazole; benzoates such as phenyl salicylate, resorcinol monobenzoate, 2,4-di-tert-butylphenyl-3,5-di-tert-butyl-4-hydroxy benzoate, 2,4-di-tert-amylphenyl-3,5-di-tert-butyl-4-hydroxy benzoate and hexadecyl-3,5-di-tert-butyl-4-hydroxy benzoate; substituted oxanilides such as 2-ethyl-2'-ethoxyoxanilide and 2-ethoxy-4'-dodecyloxanilide; cyanoacrylates such as ethyl-α-cyano-β,β-diphenyl acrylate and methyl-2-cyano-3-methyl-3-(p-methoxyphenyl)acrylate; and triaryl triazines 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine and 2-(2-hydroxy-4-propoxy-5-methylphenyl)-4,6-bis(2,4-di-tert-butylphenyl)-s-triazine. The amount of the above-described ultraviolet absorber(s) to be used in the flame-retardant resin composition is preferably 0.001 to 5% by mass, more preferably 0.05 to 3% by mass.

Examples of the above-described hindered amine-based light stabilizer include hindered amine compounds such as 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-tetramethyl-4-piperidyl)sebacate, bis(1-oxtoxy-2,2,6,6-tetramethyl-4-piperidyl)sebacate, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, bis(2,2,6,6-tetramethyl-4-piperidyl)·di(tridecyl)-1,2,3,4-butane tetracarboxylate, bis(1,2,2,6,6-pentamethyl-4-piperidyl)·di(tridecyl)-1,2,3,4-butane tetracarboxylate, bis(1,2,2,4,4-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-yl] aminoundecane and 1,6,11-tris[2,4-bis(N-butyl-N-(1,2,2,6,6-pentamethyl-4-piperidyl)amino)-s-triazine-6-yl] aminoundecane. The amount of the above-described hindered amine-based light stabilizer(s) to be used in the flame-retardant resin composition is preferably 0.001 to 5% by mass, more preferably 0.05 to 3% by mass.

Examples of the above-described anti-aging agent include naphthylamine-based anti-aging agents, diphenylamine-based anti-aging agents, p-phenyldiamine-based anti-aging agents, quinoline-based anti-aging agents, hydroquinone derivatives, monophenol-based anti-aging agents, thiobisphenol-based anti-aging agents, hindered phenol-based anti-aging agents and phosphite-based anti-aging agents. The amount of the above-described anti-aging agent(s) to be used in the flame-retardant resin composition is preferably 0.001 to 5% by mass, more preferably 0.05 to 3% by mass.

In the flame-retardant resin composition of the present invention, a reinforcing material may also be incorporated as an arbitrary component in such a range which does not adversely affect the effects of the present invention. As this reinforcing material, one which is normally used in the form of fibers, plate, particles or powder for reinforcement of a synthetic resin can be employed. Specific examples of such reinforcing material include inorganic fibrous reinforcing materials such as glass fibers, asbestos fibers, carbon fibers, graphite fibers, metal fibers, potassium titanate whiskers, aluminum borate whiskers, magnesium-based whiskers, silicon-based whiskers, wollastonite, sepiolite, asbestos, slag fibers, zonolite, ellestadite, gypsum fibers, silica fibers, silica-alumina fibers, zirconia fibers, boron nitride fibers, silicon nitride fibers and boron fibers; organic fibrous reinforcing materials such as polyester fibers, nylon fibers, acrylic fibers, regenerated cellulose fibers, acetate fibers, kenaf, ramie, cotton, jute, hemp, sisal, flax, linen, silk, Manila hemp, sugarcane, wood pulp, wastepaper, recycled wastepaper and wool; plate-form and particle-form reinforcing materials such as glass flake, non-swelling mica, graphites, metal foils, ceramic beads, clay, mica, sericite, zeolite, bentonite, dolomite, kaolin, fine powder silicic acid, feldspar powder, potassium titanate, shirasu balloon, calcium carbonate, magnesium carbonate, barium sulfate, calcium oxide, aluminum oxide, titanium oxide, aluminum silicate, silicon oxide, gypsum, novaculite, dawsonite and white clay. These reinforcing materials may also be coated or bundled with a thermoplastic resin such as an ethylene/vinyl acetate copolymer or a thermosetting resin such as an epoxy resin, or may be treated with a coupling agent such as aminosilane or epoxysilane.

In the flame-retardant resin composition of the present invention, a nucleating agent may also be incorporated as an arbitrary component in such a range which does not adversely affect the effects of the present invention. As the nucleating agent, one which is generally used as a nucleating agent of a polymer can be employed as appropriate and, in the present invention, any of inorganic nucleating agents and organic nucleating agents can be used.

Specific examples of the above-described inorganic nucleating agents include kaolinite, synthetic mica, clay, zeolite, silica, graphite, carbon black, magnesium oxide, titanium oxide, calcium sulfide, boron nitride, calcium carbonate, barium sulfate, aluminum oxide, neodymium oxide and metal salts of phenyl phosphonate and the like. These inorganic nucleating agents may be modified with an organic substance in order to improve their dispersion in the resin composition.

Specific examples of the organic nucleating agents include metal organic carboxylates such as sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanate, calcium octacosanate, sodium stearate, potassium stearate, lithium stearate, calcium stearate, magnesium stearate, barium stearate, sodium montanate, calcium montanate, toluic acid sodium, sodium salicylate, potassium salicylate, zinc salicylate, aluminum dibenzoate, potassium dibenzoate, lithium dibenzoate, sodium β-naphthalate and sodium cyclohexane carboxylate; organic sulfonates such as sodium p-toluenesulfonate and sodium sulfoisophthalate; carboxylic acid amides such as stearic acid amide, ethylenebis lauric acid amide, palmitic acid amide, hydroxystearic acid amide, erucic acid amide and trimesic acid tris(t-butylamide); benzylidene sorbitol and derivatives thereof; metal salts of phosphorus compounds such as sodium-2,2'-methylenebis(4,6-di-t-butylphenyl)phosphate; and 2,2-methylbis(4,6-di-t-butylphenyl)sodium.

In the flame-retardant resin composition of the present invention, a plasticizer may also be incorporated as an arbitrary component in such a range which does not adversely affect the effects of the present invention. As the plasticizer, one which is generally used as a plasticizer of a polymer can be employed as appropriate, and examples thereof include polyester-based plasticizers, glycerin-based plasticizers, polyvalent carboxylic acid ester-based plasticizers, polyalkylene glycol-based plasticizers and epoxy-based plasticizer.

Specific examples of the polyester-based plasticizers include polyesters that are composed of an acid component, such as adipic acid, sebacic acid, terephthalic acid, isophthalic acid, naphthalenedicarboxylic acid, diphenyldicarboxylic acid or rosin, and a diol component such as propylene glycol, 1,3-butanediol, 1,4-butanediol, 1,6-hexane diol, ethylene glycol or diethylene glycol; and polyesters composed of hydroxycarboxylic acid such as polycaprolactone. The terminals of these polyesters may be blocked with a monofunctional carboxylic acid, a monofunctional alcohol, an epoxy compound or the like.

Specific examples of the glycerin-based plasticizers include glycerin monoacetomonolaurate, glycerin diacetomonolaurate, glycerin monoacetomonostearate, glycerin diacetomonooleate and glycerin monoacetomonomontanate.

Specific examples of the polyvalent carboxylic acid ester-based plasticizers include phthalates such as dimethyl phthalate, diethyl phthalate, dibutyl phthalate, dioctyl phthalate, diheptyl phthalate, dibenzyl phthalate and butyl benzyl phthalate; trimellitates such as tributyl trimellitate, trioctyl trimellitate and trihexyl trimellitate; adipates such as diisodecyl adipate, n-octyl-n-decyl adipate, methyl diglycol butyl diglycol adipate, benzyl methyl diglycol adipate and benzyl butyl diglycol adipate; citrates such as acetyl triethyl citrate and acetyl tributyl citrate; azelates such as di-2-ethylhexyl azelate; and sebacates such as dibutyl sebacate and di-2-ethylhexyl sebacate.

Specific examples of the polyalkylene glycol-based plasticizers include polyalkylene glycols such as polyethylene glycols, polypropylene glycols, poly(ethylene oxide-propylene oxide) block and/or random copolymers, polytetramethylene glycols, ethylene oxide addition polymers of bisphenols, propylene oxide addition polymers of bisphenols and tetrahydrofuran oxide addition polymers of bisphenols; and terminal-blocked compounds thereof such as terminal epoxy-modified compounds, terminal ester-modified compounds and terminal ether-modified compounds.

The term "epoxy-based plasticizer" generally refers to epoxy triglyceride composed of alkyl epoxy stearate and soybean oil; however, in addition thereto, a so-called epoxy resin, which is produced using bisphenol A and epichlorohydrin as main starting materials, can also be used.

Specific examples of other plasticizers include benzoates of aliphatic polyols such as neopentyl glycol dibenzoate, diethylene glycol dibenzoate and triethylene glycol di-2-ethyl butyrate; fatty acid amides such as stearic acid amide; aliphatic carboxylates such as butyl oleate; oxyacid esters such as methyl acetyl ricinoleate and butyl acetyl ricinoleate; pentaerythritol; various sorbitols; polyacrylates; and paraffins.

In cases where a plasticizer is used in the present invention, the above-described plasticizers may be used individually, or two or more thereof may be used in combination.

In the flame-retardant resin composition of the present invention, as required, at least one halogen-free organic or inorganic flame retardant or flame retardant auxiliary can be further used in such a range which does not adversely affect the effects of the present invention. Examples of such flame retardant and flame retardant auxiliary include triazine ring-containing compounds, metal hydroxides, phosphate-based flame retardants, condensed phosphate-based flame retardants, phosphate-based flame retardants, inorganic phosphorus-based flame retardants, dialkyl phosphinates, silicone-based flame retardants, metal oxides, boric acid compounds, expandable graphites, other inorganic flame retardant auxiliaries, pentaerythritol and other organic flame retardants.

Examples of the above-described triazine ring-containing compounds include melamine, ammeline, benzoguanamine, acetoguanamine, phthalodiguanamine, melamine cyanurate, butylene diguanamine, norbornene diguanamine, methylene diguanamine, ethylene dimelamine, trimethylene dimelamine, tetramethylene dimelamine, hexamethylene dimelamine and 1,3-hexylene dimelamine.

Examples of the above-described metal hydroxides include magnesium hydroxide, aluminum hydroxide, calcium hydroxide, barium hydroxide, zinc hydroxide and KISUMA 5A (trademark; magnesium hydroxide manufactured by Kyowa Chemical Industry Co., Ltd.).

Examples of the above-described phosphate-based flame retardants include trimethyl phosphate, triethyl phosphate, tributyl phosphate, tributoxyethyl phosphate, trischloroethyl phosphate, trisdichloropropyl phosphate, triphenyl phosphate, tricresyl phosphate, cresyldiphenyl phosphate, trixylenyl phosphate, octyldiphenyl phosphate, xylenyldiphenyl phosphate, trisisopropylphenyl phosphate, 2-ethylhexyldiphenyl phosphate, t-butylphenyldiphenyl phosphate, bis-(t-butylphenyl)phenyl phosphate, tris-(t-butylphenyl)phosphate, isopropylphenyldiphenyl phosphate, bis-(isopropylphenyl)diphenyl phosphate and tris-(isopropylphenyl)phosphate.

Examples of the above-described condensed phosphate-based flame retardants include 1,3-phenylenebis(diphenylphosphate), 1,3-phenylenebis(dixylenylphosphate) and bisphenol A-bis(diphenylphosphate).

Examples of the above-described inorganic phosphorus-based flame retardants include red phosphorus.

Examples of the above-described dialkyl phosphinates include aluminum diethylphosphinate and zinc diethylphosphinate.

Examples of the above-described other inorganic flame retardant auxiliaries include inorganic compounds such as titanium oxide, aluminum oxide, magnesium oxide and hydrotalcite; and their surface-treated products. Specific examples thereof include various commercially available products such as TIPAQUE R-680 (trademark; titanium oxide manufactured by Ishihara Sangyo Kaisha, Ltd.), KYOWA MAG 150 (trademark; magnesium oxide manufactured by Kyowa Chemical Industry Co., Ltd.), DHT-4A (hydrotalcite manufactured by Kyowa Chemical Industry Co., Ltd.) and ALCAMIZER 4 (trademark; zinc-modified hydrotalcite manufactured by Kyowa Chemical Industry Co., Ltd.).

In addition, in the flame-retardant resin composition of the present invention, as required, an additive(s) normally used in a synthetic resin, such as a cross-linking agent, an antistatic agent, a metal soap, a filler, an anti-fogging agent, a plate-out inhibitor, a surface treatment agent, a fluorescent agent, an antifungal agent, a disinfectant, a foaming agent, a metal inactivator, a mold-releasing agent, a pigment and/or a processing aid, can be incorporated in such a range which does not adversely affect the effects of the present invention.

The flame-retardant resin composition of the present invention can be suitably used as an insulator, a coating or a sheath of an electric wire or cable. Further, it is preferred that the flame-retardant resin composition of the present invention be a halogen-free flame-retardant resin composition. That is, it is preferred that no halogen be contained or the amount thereof be reduced also in arbitrary components other than the thermoplastic resin and the components (A) and (B). Such the halogen-free flame-retardant resin composition can be suitably used in eco-material electric wires and it may also be used in optical fiber cables.

EXAMPLES

The present invention will now be described by way of examples and comparative examples thereof. However, the present invention is not restricted to thereto by any means. It is noted here that the blended amounts shown in Tables 1 to 4 are all based on parts by mass.

Examples 1 to 17

The respective components shown in Tables 1 and 2 were blended to obtain halogen-free flame-retardant resin compositions for electric wires. In Tables 1 and 2, the content ratio of the components (A) and (B) in each resin composition is shown in terms of mass ratio and the total content and the nitrogen contents of the components (A) and (B) in each resin composition are shown in terms of % by mass.

The thus obtained halogen-free flame-retardant resin compositions for electric wires were each extruded under the below-described processing conditions to produce pellets. The resulting pellets were each press-molded at 200° C. to obtain test pieces for testing the flame retardancy and the smoke density. These pellets were also use to test the electric conductivity and the acidity of a gas generated during combustion.

Further, under the below-described test conditions, the flame retardancy test and the measurements of the electric conductivity and the acidity of a gas generated during combustion and the smoke density were carried out. The results thereof are shown in Tables 1 and 2.

Comparative Examples were also tested in the same manner and the results thereof are shown in Tables 3 and 4.

The compounds (A) and (B) were produced by the following methods. The component (C) was zinc oxide.

Production Example 1

Component (A): piperazine pyrophosphate
The component (A) was produced by allowing pyrophosphoric acid and piperazine to react at a molar ratio of 1:1.

Production Example 2

Component (B): melamine pyrophosphate
The component (B) was produced by allowing pyrophosphoric acid and melamine to react at a molar ratio of 1:2.

<Processing Conditions>
Extruder: TEX 28V-42CW-4V (manufactured by The Japan Steel Works, Ltd.)
Temperature: 210° C.
Screw: biaxial screw
Screw speed: 50 rpm <Flame Retardancy Test>
The flame retardancy was evaluated by performing the test according to the UL94VTM standard (Vertical flame test for thin materials), which prescribes a flame retardancy standard. Here, a test piece having a size of 200 mm×50 mm×0.3 mm was used. The flame retardancy rating decreases from VTM-1 to VTM-2, with VTM-0 being the highest rating. It is noted here that an evaluation "NR" was given when none of the ratings VTM-0 to VTM-2 was applicable.

<Electric Conductivity and Acidity of Gas Generated During Combustion>
These properties were both measured in accordance with IEC 60754-2.

<Smoke Density>
The smoke density was measured in accordance with IEC 60695-6-30. Here, a test piece having a size of 76.2 mm×76.2 mm×0.5 mm was used. The measurement was performed three times and an average thereof was taken.

TABLE 1

| | | Example | | | | | | | | |
|---|---|---|---|---|---|---|---|---|---|---|
| | | 1 | 2 | 3 | 4 | 5 | 6 | 7 | 8 | 9 |
| Blended amount | Low-density polyethylene[*1] | 36.6 | 36.6 | 36.6 | 36.6 | 34.0 | 34.0 | 34.0 | 34.0 | 34.0 |
| | Ethylene-vinyl acetate copolymer[*2] | 36.6 | 36.6 | 36.6 | 36.6 | 34.0 | 34.0 | 34.0 | 34.0 | 34.0 |
| | Phenol-based antioxidant[*3] | 0.1 | 0.1 | 0.1 | 0.1 | 0.1 | 0.1 | 0.1 | 0.1 | 0.1 |
| | Phosphorus-based antioxidant[*4] | 0.1 | 0.1 | 0.1 | 0.1 | 0.1 | 0.1 | 0.1 | 0.1 | 0.1 |
| | Lubricant[*5] | 0.1 | 0.1 | 0.1 | 0.1 | 0.1 | 0.1 | 0.1 | 0.1 | 0.1 |
| | Lubricant[*6] | 0.3 | 0.3 | 0.3 | 0.3 | 0.3 | 0.3 | 0.3 | 0.3 | 0.3 |
| | Component (A) | 15.0 | 16.25 | 17.5 | 18.75 | 22.5 | 24.0 | 25.5 | 27.0 | 28.5 |
| | Content of nitrogen originated from component (A) (%) | 1.59 | 1.72 | 1.86 | 1.99 | 2.39 | 2.55 | 2.71 | 2.86 | 3.02 |
| | Component (B) | 10.0 | 8.75 | 7.5 | 6.25 | 7.5 | 6.0 | 4.5 | 3.0 | 1.5 |
| | Content of nitrogen originated from component (B) (%) | 3.91 | 3.42 | 2.93 | 2.44 | 2.93 | 2.34 | 1.76 | 1.17 | 0.59 |
| | Total nitrogen content (%) | 5.5 | 5.14 | 4.79 | 4.43 | 5.32 | 4.89 | 4.47 | 4.03 | 3.61 |
| | Component (C) | 1.25 | 1.25 | 1.25 | 1.25 | 1.5 | 1.5 | 1.5 | 1.5 | 1.5 |
| Content ratio of components (A) and (B) (mass ratio) | | 60:40 | 65:35 | 70:30 | 75:25 | 75:25 | 80:20 | 85:15 | 90:10 | 95:5 |
| Total content of components (A) and (B) (% by mass) | | 25 | 25 | 25 | 25 | 30 | 30 | 30 | 30 | 30 |
| UL94VTM | | VTM-2 | VTM-2 | VTM-2 | VTM-2 | VTM-0 | VTM-0 | VTM-2 | VTM-2 | VTM-2 |
| Electric conductivity of gas generated during combustion ($\mu$S/mm) | | 9.7 | 8.8 | 8.1 | 7.4 | 8.9 | 7.6 | 7.1 | 6.3 | 5.1 |
| Acidity of gas generated during combustion (pH) | | 8.33 | 8.44 | 8.14 | 7.87 | 8.29 | 8.04 | 7.82 | 7.76 | 7.60 |
| Smoke density | | 55.6 | 31.5 | 29.3 | 27.0 | 43.7 | 40.8 | 35.2 | 32.1 | 28.8 |

[*1] low-density polyethylene (manufactured by Japan Polyethylene Corporation: NOVATEC LF441B)
[*2] ethylene-vinyl acetate copolymer (manufactured by Tosoh Corporation: ULTRACENE 635)
[*3] tetrakis[3-(3,5-di-tert-butyl-4-hydroxyphenyl)propionyloxymethyl]methane (ADK STAB AO-60, manufactured by ADEKA Corporation)
[*4] tris(2,4-di-tert-butylphenyl)phosphite (ADK STAB 2112, manufactured by ADEKA Corporation)
[*5] calcium stearate
[*6] glycerin monostearate

TABLE 2

| | | Example | | | | | | | |
|---|---|---|---|---|---|---|---|---|---|
| | | 10 | 11 | 12 | 13 | 14 | 15 | 16 | 17 |
| Blended amount | Low-density polyethylene[*1] | 34.0 | 31.3 | 31.3 | 31.3 | 31.3 | 31.3 | 28.7 | 28.7 |
| | Ethylene-vinyl acetate copolymer[*2] | 34.0 | 31.3 | 31.3 | 31.3 | 31.3 | 31.3 | 28.7 | 28.7 |
| | Phenol-based antioxidant[*3] | 0.1 | 0.1 | 0.1 | 0.1 | 0.1 | 0.1 | 0.1 | 0.1 |
| | Phosphorus-based antioxidant[*4] | 0.1 | 0.1 | 0.1 | 0.1 | 0.1 | 0.1 | 0.1 | 0.1 |
| | Lubricant[*5] | 0.1 | 0.1 | 0.1 | 0.1 | 0.1 | 0.1 | 0.1 | 0.1 |
| | Lubricant[*6] | 0.3 | 0.3 | 0.3 | 0.3 | 0.3 | 0.3 | 0.3 | 0.3 |
| | Component (A) | 30.0 | 28.0 | 29.75 | 31.5 | 33.25 | 35.0 | 38.0 | 40.0 |
| | Content of nitrogen originated from component (A) (%) | 3.18 | 2.97 | 3.16 | 3.34 | 3.53 | 3.71 | 4.03 | 4.24 |
| | Component (B) | 0 | 7.0 | 5.25 | 3.5 | 1.75 | 0 | 2.0 | 0 |
| | Content of nitrogen originated from component (B) (%) | 0 | 2.73 | 2.05 | 1.37 | 0.68 | 0 | 0.78 | 0 |
| | Total nitrogen content (%) | 3.18 | 5.7 | 5.21 | 4.71 | 4.21 | 3.71 | 4.81 | 4.24 |
| | Component (C) | 1.5 | 1.75 | 1.75 | 1.75 | 1.75 | 1.75 | 2.0 | 2.0 |
| Content ratio of components (A) and (B) (mass ratio) | | 100:0 | 80:20 | 85:15 | 90:10 | 95:5 | 100:0 | 95:5 | 100:0 |
| Total content of components (A) and (B) (% by mass) | | 30 | 35 | 35 | 35 | 35 | 35 | 40 | 40 |
| UL94VTM | | VTM-2 | VTM-0 | VTM-0 | VTM-0 | VTM-0 | VTM-0 | VTM-0 | VTM-0 |
| Electric conductivity of gas generated during combustion ($\mu$S/mm) | | 3.2 | 9.0 | 8.0 | 7.4 | 5.7 | 4.7 | 7.8 | 5.7 |

TABLE 2-continued

|  | Example | | | | | | | |
|---|---|---|---|---|---|---|---|---|
|  | 10 | 11 | 12 | 13 | 14 | 15 | 16 | 17 |
| Acidity of gas generated during combustion (pH) | 7.44 | 8.12 | 7.95 | 7.96 | 7.68 | 7.48 | 7.83 | 7.58 |
| Smoke density | 25.4 | 42.6 | 33.7 | 31.6 | 24.6 | 22.9 | 37.3 | 21.5 |

*[1] low-density polyethylene (manufactured by Japan Polyethylene Corporation: NOVATEC LF441B)
*[2] ethylene-vinyl acetate copolymer (manufactured by Tosoh Corporation: ULTRACENE 635)
*[3] tetrakis[3-(3,5-di-tert-butyl-4-hydroxyphenyl)propionyloxymethyl]methane (ADK STAB AO-60, manufactured by ADEKA Corporation)
*[4] tris(2,4-di-tert-butylphenyl)phosphite (ADK STAB 2112, manufactured by ADEKA Corporation)
*[5] calcium stearate
*[6] glycerin monostearate

TABLE 3

|  |  | Comparative Example | | | | |
|---|---|---|---|---|---|---|
|  |  | 1 | 2 | 3 | 4 | 5 |
| Blended amount | Low-density polyethylene*[1] | 36.6 | 34.0 | 34.0 | 34.0 | 34.0 |
|  | Ethylene-vinyl acetate copolymer*[2] | 36.6 | 34.0 | 34.0 | 34.0 | 34.0 |
|  | Phenol-based antioxidant*[3] | 0.1 | 0.1 | 0.1 | 0.1 | 0.1 |
|  | Phosphorus-based antioxidant*[4] | 0.1 | 0.1 | 0.1 | 0.1 | 0.1 |
|  | Lubricant*[5] | 0.1 | 0.1 | 0.1 | 0.1 | 0.1 |
|  | Lubricant*[6] | 0.3 | 0.3 | 0.3 | 0.3 | 0.3 |
|  | Component (A) | 13.75 | 0 | 16.5 | 18.0 | 19.5 |
|  | Content of nitrogen originated from component (A) (%) | 1.19 | 0 | 1.75 | 1.91 | 2.07 |
|  | Component (B) | 11.25 | 30.0 | 13.5 | 12.0 | 10.5 |
|  | Content of nitrogen originated from component (B) (%) | 4.4 | 11.72 | 5.27 | 4.69 | 4.10 |
|  | Total nitrogen content (%) | 5.59 | 11.72 | 7.02 | 6.6 | 6.17 |
|  | Component (C) | 1.25 | 1.5 | 1.5 | 1.5 | 1.5 |
|  | Content ratio of components (A) and (B) (mass ratio) | 55:45 | 0:100 | 55:45 | 60:40 | 65:35 |
|  | Total content of components (A) and (B) (% by mass) | 25 | 30 | 30 | 30 | 30 |
|  | UL94VTM | VTM-0 | NR | VTM-0 | VTM-0 | VTM-0 |
|  | Electric conductivity of gas generated during combustion (μS/mm) | 10.9 | 12.8 | 12.2 | 11.8 | 11.0 |
|  | Acidity of gas generated during combustion (pH) | 8.75 | 9.05 | 8.99 | 8.93 | 8.73 |
|  | Smoke density | 39.5 | 59.7 | 56.1 | 52.4 | 47.3 |

*[1] low-density polyethylene (manufactured by Japan Polyethylene Corporation: NOVATEC LF441B)
*[2] ethylene-vinyl acetate copolymer (manufactured by Tosoh Corporation: ULTRACENE 635)
*[3] tetrakis[3-(3,5-di-tert-butyl-4-hydroxyphenyl)propionyloxymethyl]methane (ADK STAB AO-60, manufactured by ADEKA Corporation)
*[4] tris(2,4-di-tert-butylphenyl)phosphite (ADK STAB 2112, manufactured by ADEKA Corporation)
*[5] calcium stearate
*[6] glycerin monostearate

TABLE 4

|  |  | Comparative Example | | | | | | | | |
|---|---|---|---|---|---|---|---|---|---|---|
|  |  | 6 | 7 | 8 | 9 | 10 | 11 | 12 | 13 | 14 |
| Blended amount | Low-density polyethylene*[1] | 31.3 | 31.3 | 31.3 | 31.3 | 28.7 | 28.7 | 28.7 | 28.7 | 28.7 |
|  | Ethylene-vinyl acetate copolymer*[2] | 31.3 | 31.3 | 31.3 | 31.3 | 28.7 | 28.7 | 28.7 | 28.7 | 28.7 |
|  | Phenol-based antioxidant*[3] | 0.1 | 0.1 | 0.1 | 0.1 | 0.1 | 0.1 | 0.1 | 0.1 | 0.1 |
|  | Phosphorus-based antioxidant*[4] | 0.1 | 0.1 | 0.1 | 0.1 | 0.1 | 0.1 | 0.1 | 0.1 | 0.1 |
|  | Lubricant*[5] | 0.1 | 0.1 | 0.1 | 0.1 | 0.1 | 0.1 | 0.1 | 0.1 | 0.1 |
|  | Lubricant*[6] | 0.3 | 0.3 | 0.3 | 0.3 | 0.3 | 0.3 | 0.3 | 0.3 | 0.3 |
|  | Component (A) | 19.25 | 21.0 | 22.75 | 24.5 | 22.0 | 24.0 | 26.0 | 28.0 | 30.0 |
|  | Content of nitrogen originated from component (A) (%) | 2.04 | 2.23 | 2.41 | 2.60 | 2.33 | 2.55 | 2.76 | 2.97 | 3.18 |

TABLE 4-continued

|  | Comparative Example | | | | | | | | |
|---|---|---|---|---|---|---|---|---|---|
|  | 6 | 7 | 8 | 9 | 10 | 11 | 12 | 13 | 14 |
| Component (B) | 15.75 | 14.0 | 12.25 | 10.5 | 18.0 | 16.0 | 14.0 | 12.0 | 10.0 |
| Content of nitrogen originated from component (B) (%) | 6.15 | 5.47 | 4.79 | 4.10 | 7.03 | 6.25 | 5.47 | 4.69 | 3.91 |
| Total nitrogen content (%) | 8.19 | 7.7 | 7.2 | 6.7 | 9.36 | 8.8 | 8.23 | 7.66 | 7.09 |
| Component (C) | 1.75 | 1.75 | 1.75 | 1.75 | 2.0 | 2.0 | 2.0 | 2.0 | 2.0 |
| Content ratio of components (A) and (B) (mass ratio) | 55:45 | 60:40 | 65:35 | 70:30 | 55:45 | 60:40 | 65:35 | 70:30 | 75:25 |
| Total content of components (A) and (B) (% by mass) | 35 | 35 | 35 | 35 | 40 | 40 | 40 | 40 | 40 |
| UL94VTM | VTM-0 | VTM-0 | VTM-0 | VTM-0 | VTM-0 | VTM-0 | VTM-0 | VTM-0 | VTM-0 |
| Electric conductivity of gas generated during combustion (μS/mm) | 13.1 | 12.5 | 12.0 | 11.5 | 14.1 | 13.6 | 13.4 | 13.2 | 12.1 |
| Acidity of gas generated during combustion (pH) | 9.15 | 9.05 | 8.84 | 8.64 | 9.36 | 9.16 | 8.96 | 8.75 | 8.69 |
| Smoke density | 45.2 | 49.2 | 43.7 | 38.1 | 48.0 | 45.9 | 42.5 | 33.9 | 39.5 |

*[1] low-density polyethylene (manufactured by Japan Polyethylene Corporation: NOVATEC LF441B)
*[2] ethylene-vinyl acetate copolymer (manufactured by Tosoh Corporation: ULTRACENE 635)
*[3] tetrakis[3-(3,5-di-tert-butyl-4-hydroxyphenyl)propionyloxymethyl]methane (ADK STAB AO-60, manufactured by ADEKA Corporation)
*[4] tris(2,4-di-tert-butylphenyl)phosphite (ADK STAB 2112, manufactured by ADEKA Corporation)
*[5] calcium stearate
*[6] glycerin monostearate

The invention claimed is:

1. A flame-retardant resin composition, comprising both of the below-described components (A) and (B) as flame retardant components in a halogen-free thermoplastic resin, wherein, when said flame-retardant resin composition comprises said component (B), the ratio of said components (A) and (B) is 100:0 to 60:40 in terms of mass ratio; the electric conductivity of a gas generated during combustion, which is measured in accordance with IEC 60754-2, is not higher than 10.0 μS/mm; and the flame retardancy rating measured in accordance with the UL94VTM standard is VTM-2 or higher:

component (A): a (poly)phosphate compound represented by the following Formula (1):

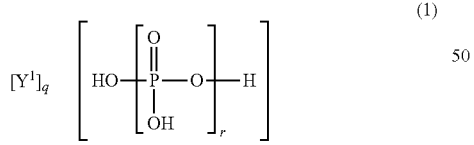

(wherein, r represents a number of 1 to 100; $Y^1$ represents $[R^1R^2N(CH_2)_mNR^3R^4]$, piperazine or a piperazine ring-containing diamine; $R^1$, $R^2$, $R^3$ and $R^4$ each independently represent a hydrogen atom or a linear or branched alkyl group having 1 to 5 carbon atoms; $R^1$, $R^2$, $R^3$ and $R^4$ may be the same group or different groups; m represents an integer of 1 to 10; and q represents a number which satisfies a relationship, $0<q\leq r+2$); and component (B): a melamine pyrophosphate compound represented by the following Formula (2):

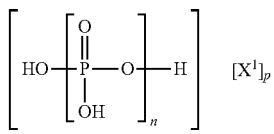

wherein n is 2, p is 2, and $X^1$ is melamine;

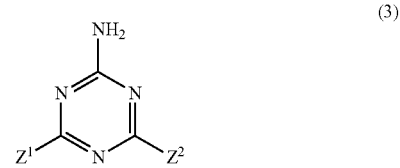

(wherein, $Z^1$ and $Z^2$ may be the same or different and are each a group selected from the group consisting of a $-NR^5R^6$ group [wherein, $R^5$ and $R^6$ each independently represent a hydrogen atom, a linear or branched alkyl group having 1 to 6 carbon atoms or a methylol group], a hydroxy group, a mercapto group, a linear or branched alkyl group having 1 to 10 carbon atoms, a linear or branched alkoxy group having 1 to 10 carbon atoms, a phenyl group and a vinyl group).

2. The flame-retardant resin composition according to claim 1, wherein, based on the total amount thereof, the content of nitrogen originated from said component (B) is 0% by mass to less than 4.0% by mass and the total content of nitrogen originated from said component (A) and nitrogen originated from said component (B) is 3.0% by mass to less than 5.75% by mass.

3. The flame-retardant resin composition according to claim 1, wherein the ratio of said components (A) and (B) is 100:0 to 60:40 in terms of mass ratio and the content of said component (B) is 9 parts by mass or less with respect to 100 parts by mass of said flame-retardant resin composition.

4. The flame-retardant resin composition according to claim 1, wherein the total content of said components (A) and (B) is 25 to 40% by mass.

5. The flame-retardant resin composition according to claim 1, which further comprises zinc oxide as a component (C).

6. The flame-retardant resin composition according to claim 1, wherein said component (A) is a piperazine polyphosphate in which, in said Formula (1), q is 1 and $Y^1$ is piperazine.

7. The flame-retardant resin composition according to claim 6, wherein said piperazine polyphosphate is piperazine pyrophosphate.

8. The flame-retardant resin composition according to claim 1, wherein said thermoplastic resin comprises at least one polyolefin-based resin.

9. The flame-retardant resin composition according to claim 8, wherein said polyolefin-based resin is a polyethylene-based resin.

10. The flame-retardant resin composition according to claim 1, which is a halogen-free flame-retardant resin composition.

11. The flame-retardant resin composition according to claim 1, which is for an electric wire.

12. A halogen-free flame-retardant electric wire or cable, using the halogen-free flame-retardant resin composition for an electric wire according to claim 11.

* * * * *